United States Patent
Shirakawa

(10) Patent No.: US 10,531,387 B2
(45) Date of Patent: Jan. 7, 2020

(54) COMMUNICATION APPARATUS FOR CONTROLLING INTERVAL OF SIGNAL IN COMMUNICATION WITH EXTERNAL APPARATUS, CONTROL METHOD FOR THE COMMUNICATION APPARATUS, AND RECORDING MEDIUM

(71) Applicant: CANON KABUSHIKI KAISHA, Tokyo (JP)

(72) Inventor: Yusuke Shirakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/878,303

(22) Filed: Jan. 23, 2018

(65) Prior Publication Data
US 2018/0213479 A1  Jul. 26, 2018

(30) Foreign Application Priority Data
Jan. 26, 2017 (JP) .................... 2017-012535

(51) Int. Cl.
*H04W 52/02* (2009.01)
*H04W 4/80* (2018.01)
*H04W 76/10* (2018.01)

(52) U.S. Cl.
CPC ......... *H04W 52/0229* (2013.01); *H04W 4/80* (2018.02); *H04W 76/10* (2018.02); *Y02D 70/00* (2018.01); *Y02D 70/10* (2018.01); *Y02D 70/14* (2018.01); *Y02D 70/142* (2018.01); *Y02D 70/144* (2018.01); *Y02D 70/162* (2018.01); *Y02D 70/166* (2018.01)

(58) Field of Classification Search
CPC ......... H04W 52/0229; H04W 52/0225; H04W 52/0241; H04W 52/0251; H04W 52/0254; H04W 4/80; H04M 1/72527; H04M 1/7253; H04M 1/72533; H04M 2250/02
See application file for complete search history.

(56) References Cited

U.S. PATENT DOCUMENTS

| 10,064,222 B2* | 8/2018 | Ikeda ............... H04L 12/12 |
| 2010/0077234 A1* | 3/2010 | Das ............... G06F 1/3203 713/300 |
| 2016/0353382 A1* | 12/2016 | Xue ............... H04W 52/0251 |
| 2017/0013153 A1* | 1/2017 | Shin ............... H04W 76/10 |
| 2017/0034647 A1* | 2/2017 | Takeuchi ............... H04W 8/005 |
| 2017/0086204 A1* | 3/2017 | Jung ............... H04W 4/80 |

(Continued)

FOREIGN PATENT DOCUMENTS

JP   2009-246597 A   10/2009

*Primary Examiner* — Devan A Sandiford
(74) *Attorney, Agent, or Firm* — Canon U.S.A., Inc. IP Division

(57) ABSTRACT

A communication apparatus includes a communication unit that transmits a signal at a predetermined interval and a control unit that includes a first state and a second state in which power consumption is lower than in the first state. When the control unit shifts from the first state to the second state, the communication unit changes a transmission interval of the signal from a first interval to a second interval, which is longer than the first interval. In a case where a predetermined time has elapsed after the control unit shifts from the first state to the second state, the communication unit changes the transmission interval of the signal to a third interval, which is longer than the second interval.

10 Claims, 8 Drawing Sheets

(56) References Cited

U.S. PATENT DOCUMENTS

| | | | |
|---|---|---|---|
| 2017/0093595 A1* | 3/2017 | Ito .................... | H04L 12/40039 |
| 2018/0078777 A1* | 3/2018 | Wu .................... | A61N 1/37252 |
| 2018/0152972 A1* | 5/2018 | Wu ...................... | H04W 76/10 |
| 2018/0285039 A1* | 10/2018 | Kawai .................... | H04W 4/80 |
| 2018/0375984 A1* | 12/2018 | Otani .................. | H04M 1/7253 |

* cited by examiner

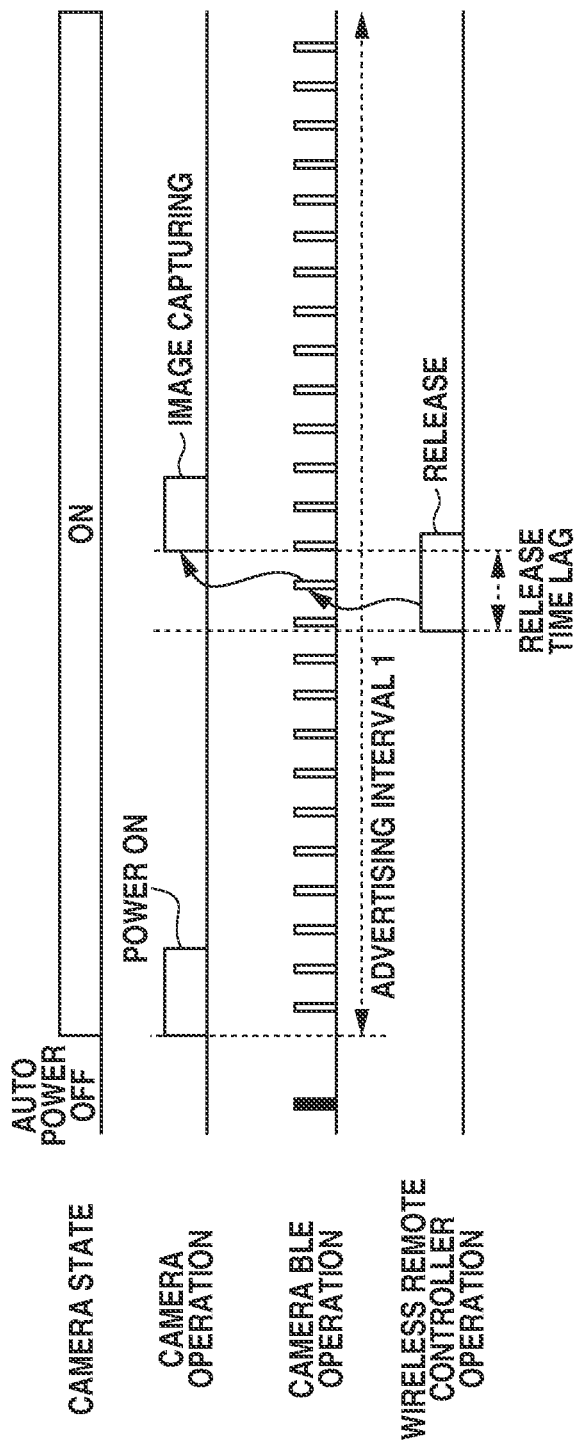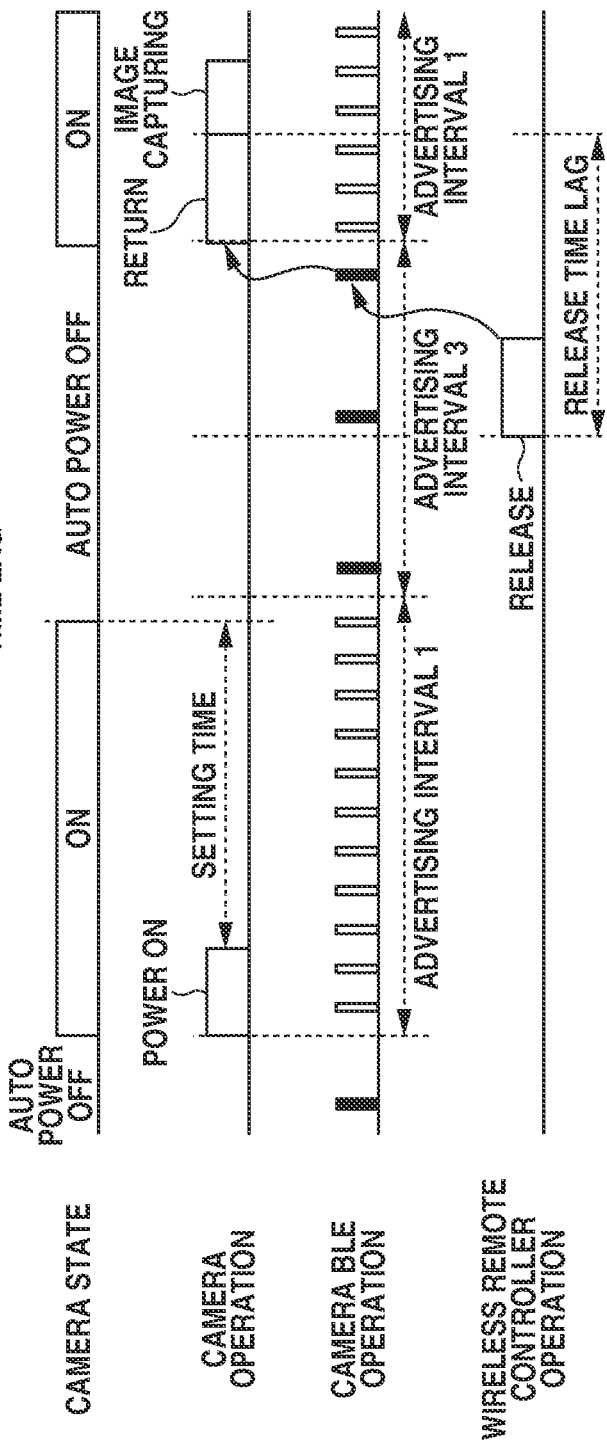

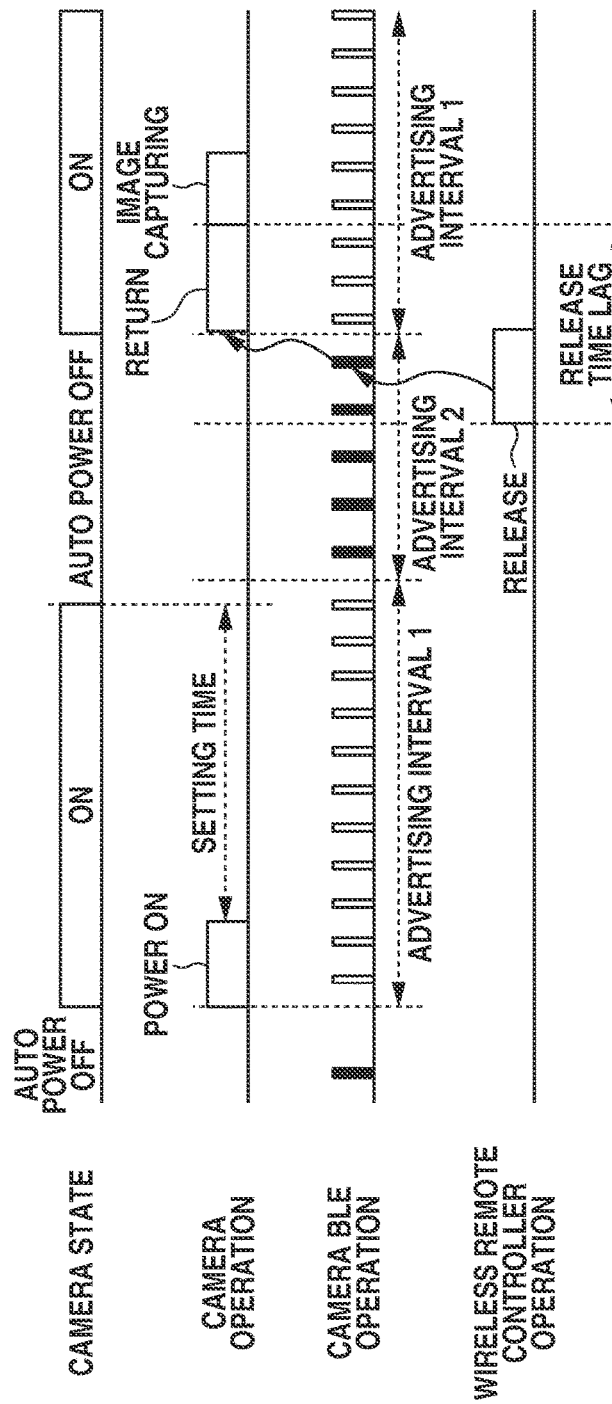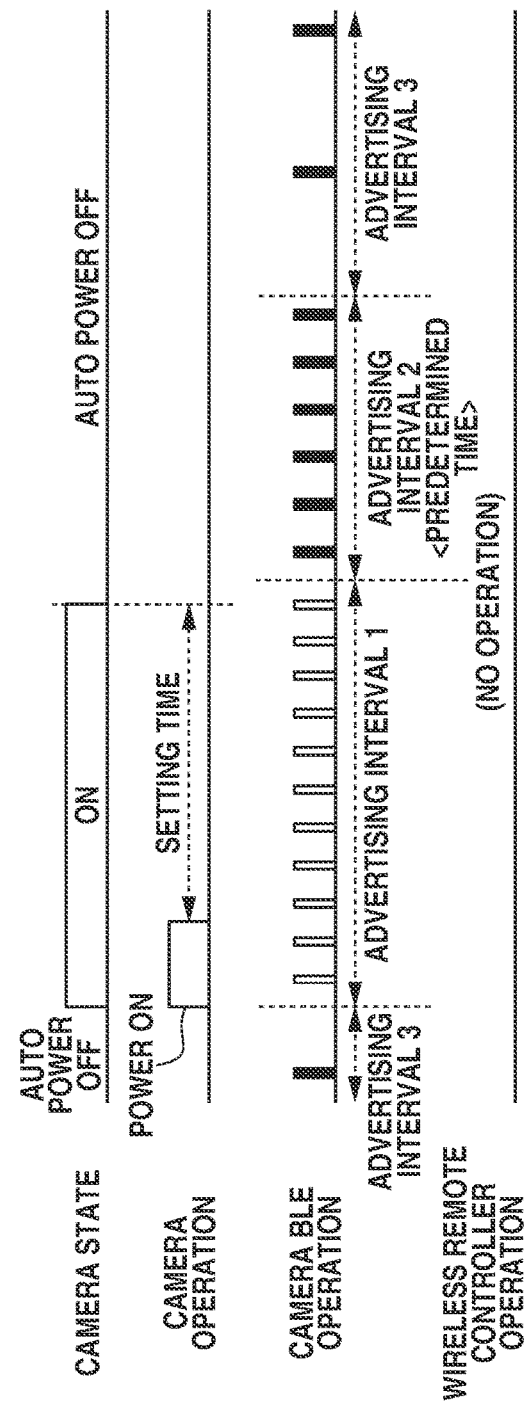

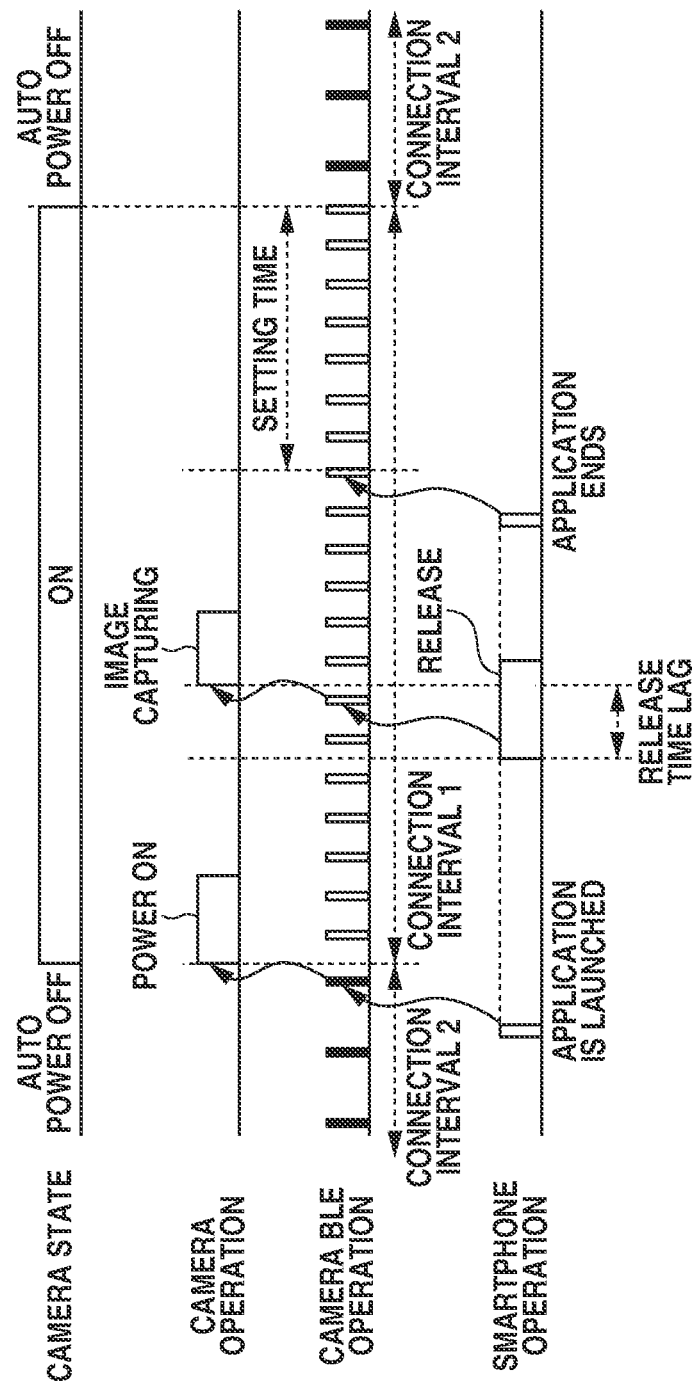

COMMUNICATION APPARATUS FOR CONTROLLING INTERVAL OF SIGNAL IN COMMUNICATION WITH EXTERNAL APPARATUS, CONTROL METHOD FOR THE COMMUNICATION APPARATUS, AND RECORDING MEDIUM

BACKGROUND

Field

The present disclosure relates to a communication apparatus controllable from an external apparatus via wireless communication.

Description of the Related Art

In recent years, digital cameras, which employ a radio wireless standard of low power consumption, such as the Bluetooth® Low Energy standard, have been in the market. Such digital cameras perform a wireless connection for various peripheral accessory devices, such as smartphones. For example, remote controllers enabling a user to remotely control release of a camera have been in the market. The remote controllers are unwired through radio waves by using the Bluetooth Low Energy. Such remote controllers, which do not show directivity, enable control in any directions and enable various display on devices near users because of bidirectional communication. Therefore, these remote controllers have excellent usability in comparison with conventional remote controllers that employ an infrared method.

However, only the employment of such a radio wireless standard cannot achieve the low power consumption in relevant devices on the whole, and thus reduction of power consumption has to be designed in accordance with characteristics of the devices.

For example, Japanese Patent Application Laid-Open No. 2009-246597 discusses a printer in which electric power is supplied to a wireless communication control circuit just before wireless communication starts and the wireless communication control circuit is shut off when processing on transmitted/received various data is completed. Therefore, electric power consumed in the wireless communication control circuit is suppressed. However, in the above-described conventional technology discussed in Japanese Patent Application Laid-Open No. 2009-246597, the electric power is saved by controlling a wireless communication section based on a request made by an operation on a device side, but the wireless communication is not controlled in consideration of user operation timing. For this reason, from a viewpoint of a quick response to user operations, this technology is occasionally inferior to the conventional infrared communication and wired communication. Particularly in a case where this technology is used for remote image capturing in a digital camera, responsivity to an operation is important.

SUMMARY

A communication apparatus includes a communication unit configured to transmit a signal at a predetermined interval and a control unit configured to include a first state and a second state in which power consumption is lower than in the first state. In a case where the control unit shifts from the first state to the second state, the communication unit changes a transmission interval of the signal from a first interval to a second interval, which is longer than the first interval, and in a case where a predetermined time has elapsed after the control unit shifts from the first state to the second state, the communication unit changes the transmission interval of the signal to a third interval which is longer than the second interval.

Further features will become apparent from the following description of exemplary embodiments with reference to the attached drawings.

BRIEF DESCRIPTION OF THE DRAWINGS

FIG. 4A is a diagram for describing one example of a sequence for controlling the digital camera using the remote controller according to the first exemplary embodiment. FIG. 4B is a diagram for describing a conventional example of a sequence for controlling the digital camera using the remote controller after a shift to an auto power-off state is made according to the first exemplary embodiment.

FIG. 5A is a diagram for describing one example of the sequence for controlling the digital camera using the remote controller according to the first exemplary embodiment. FIG. 5B is a diagram for describing one example of a sequence in which a mode of the digital camera shifts to a remote control mode according to the first exemplary embodiment.

FIG. 6 is a diagram for describing one example of the sequence for controlling the digital camera using a smartphone according to the first exemplary embodiment.

DESCRIPTION OF THE EMBODIMENTS

An exemplary embodiment will be described in detail below with reference to the accompanying drawings.

The exemplary embodiment described below is one example for realizing aspects of the present disclosure, and can be appropriately corrected or modified in accordance with a configuration of an apparatus to which the present disclosure is applied and various conditions. Further, respective exemplary embodiments can be appropriately combined.

<Configuration of Digital Camera>

Figure 1:
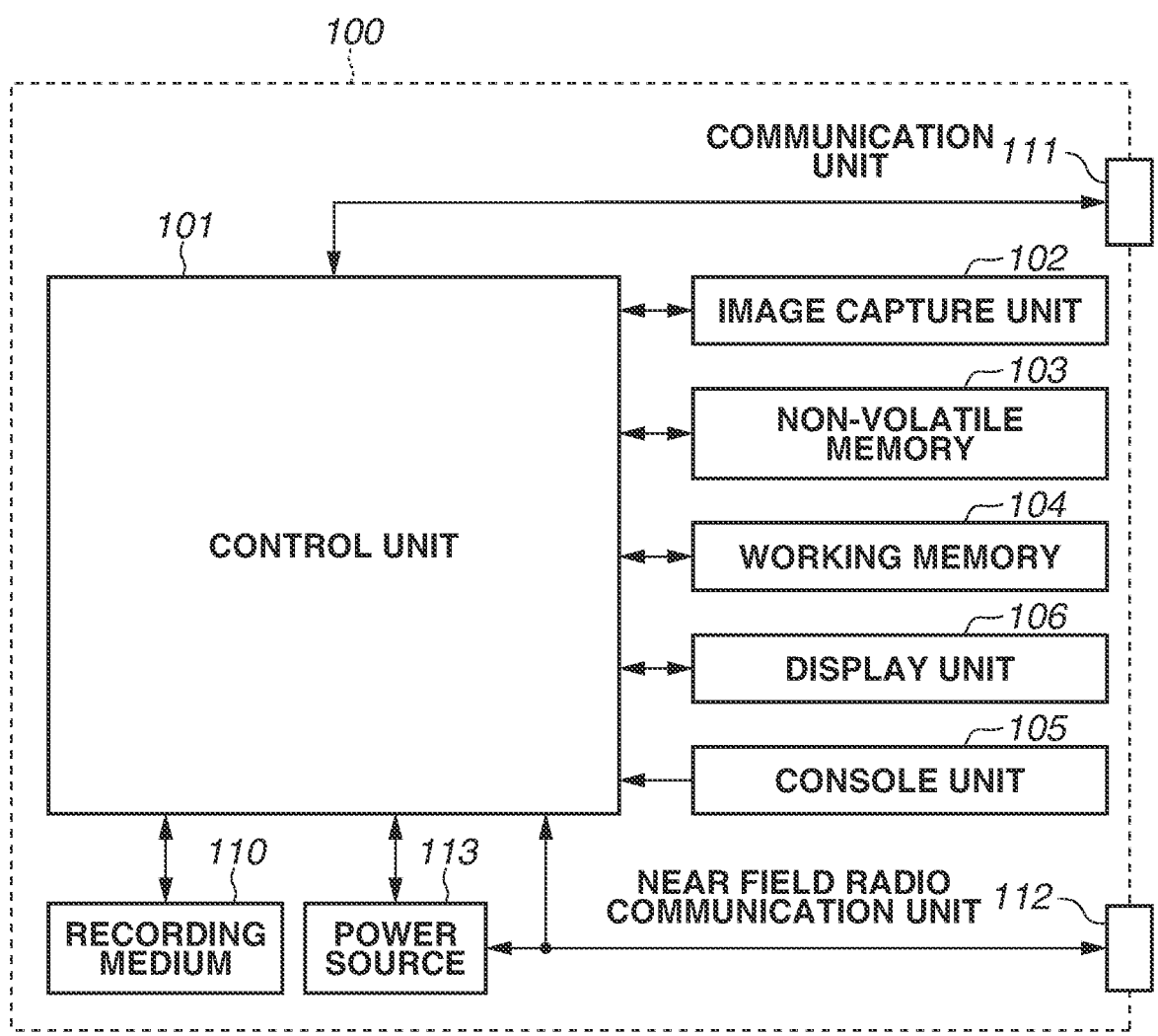
FIG. 1 is a block diagram of a digital camera according to a first exemplary embodiment.

FIG. 1 is a block diagram illustrating a configuration example of a digital camera 100 as one example of a communication apparatus according to the present exemplary embodiment. While the digital camera 100 is described, the communication apparatus is not limited thereto. For example, the communication apparatus can be a portable media player or an information processing apparatus such as a tablet or a personal computer.

A control unit 101 controls respective elements of the digital camera 100 based on an input signal or a program described below. The entire digital camera 100 is not necessarily controlled by the control unit 101, but can be controlled such that processing is shared by plural pieces of hardware.

An image capture unit 102 includes an optical lens unit, an optical system that controls a diaphragm, zoom, and focus, and an image capture element that converts light (image) introduced via the optical lens unit into an electrical image signal. As the image capture element, generally a complementary metal oxide semiconductor (CMOS) or a charge coupled device (CCD) is used. The image capture unit 102 is controlled by the control unit 101, and converts light from a subject focused by a lens of the image capture unit 102 into an electrical signal using the image capture element. The image capture unit 102 then executes a noise reduction process and outputs digital data as image data. In the digital camera 100 according to the present exemplary embodiment, the image data is recorded in a recording medium 110 in accordance with a design rule for camera file system (DCF) standard.

The non-volatile memory 103 is a memory, which can be subjected to electrically deleting and recording, and stores a program described below to be executed by the control unit 101. A working memory 104 is used as a buffer memory that temporarily holds image data captured by the image capture unit 102, an image display memory of a display unit 106, and a working area of the control unit 101.

A console unit 105 is used for accepting instructions to the digital camera 100 from a user. The console unit 105 includes a power button for a user to instruct a power ON/OFF operation of the digital camera 100, a release switch for the user to instruct image capturing, and a playback button for the user to instruct playback of image data. The console unit 105 also includes an operation member such as a connection button dedicated to starting of communication with an external apparatus via a communication unit 111 described below. A touch panel formed on the display unit 106 described below is also included in the console unit 105.

The release switch includes a switch SW1 and a switch SW2. The switch SW1 is turned on by pressing the release switch halfway down. By this operation, the console unit 105 accepts an instruction of preparation for image capturing, such as an autofocus (AF) process, an auto exposure (AE) process, an automatic white balance (AWB) process, and a pre-flash (EF) process. The switch SW2 is turned ON by pressing the release switch all the way down. By this operation, the console unit 105 accepts the image capturing instruction.

The display unit 106 displays a viewfinder image during image capturing, displays captured image data, and displays characters for an interactive operation. The display unit 106 does not always have to be incorporated into the digital camera 100. The digital camera 100 can be connectable to an internal or external display unit and can have at least a display control function of controlling display of the display unit 106.

The recording medium 110 can record image data output from the image capture unit 102. The recording medium 110 can be detachable from the digital camera 100 or be incorporated into the digital camera 100. In other words, the digital camera 100 preferably has at least a unit that accesses the recording medium 110.

The communication unit 111 is an interface for connecting to an external apparatus. The digital camera 100 according to the present exemplary embodiment can exchange data with an external apparatus via the communication unit 111. For example, image data generated by the image capture unit 102 can be transmitted to an external apparatus via the communication unit 111. In the present exemplary embodiment, the communication unit 111 includes an interface for communicating with an external apparatus via a wireless local area network (LAN) according to the IEEE 802.11 standard. The control unit 101 controls the communication unit 111 so that wireless communication with an external apparatus is realized. A communication method is not limited to the wireless LAN, and includes, for example, an infrared communication method. The communication unit 111 is one example of a first wireless communication unit.

A near field radio communication unit 112 includes an antenna for wireless communication, a modulation/demodulation circuit for processing a wireless signal, and a communication controller. The near field radio communication unit 112 outputs a modulated wireless signal from the antenna, and demodulates the wireless signal received through the antenna. In such a manner, the near field radio communication unit 112 realizes near field radio communication according to the IEEE 802.15 standard (Bluetooth®). In the present exemplary embodiment, the Bluetooth communication employs Bluetooth Low Energy, version 4.0, which consumes only a low amount of power. A communicable range is narrower in the Bluetooth communication, namely, a communicable distance is shorter, than in the wireless LAN communication. A communication speed is lower in the Bluetooth communication than in the wireless LAN communication. Power consumption, however, is lower in the Bluetooth communication than in the wireless LAN communication.

A power source 113 supplies electric power to the respective units of the digital camera 100. For description purposes, the power source 113 is only illustrated in FIG. 1 as being connected to the control unit 101 and the near field radio communication.

In the present exemplary embodiment, a communication rate to be achieved by the communication unit 111 is higher than a communication speed to be achieved by the near field radio communication unit 112. A communicable range is wider in the communication achieved by the communication unit 111 than in the communication achieved by the near field radio communication unit 112. Alternatively, the communication to be achieved by the near field radio communication unit 112 does not need a process, such as exchange of an encryption key, necessary for the communication to be realized by the communication unit 111 because the narrow communicable range of the near field radio communication unit 112 enables limitation of a communication partner. In other words, the communication can be achieved more easily by the near field radio communication unit 112 than by the communication unit 111.

The communication unit 111 of the digital camera 100 according to the present exemplary embodiment includes an access point (AP) mode in which the communication unit 111 operates as an access point in an infrastructure mode, and a client (CL) mode in which the communication unit 111 operates as a client in the infrastructure mode. The digital camera 100 according to the present exemplary embodiment can be operated as a CL device in the infrastructure mode by operating the communication unit 111 in the CL mode. In a case where the digital camera 100 operates as a CL device, the digital camera 100 can be connected to a peripheral AP device to join a network formed by the AP device. The digital camera 100 according to the present exemplary embodiment can also be operated as a simple AP, which is a kind of AP (hereinafter, simplified AP), but has an additional limited function by operating the communication unit 111 in the AP mode. In a case where the digital camera 100 operates as the simplified AP, the digital camera 100 forms a network by itself. A peripheral apparatus of the digital camera 100 recognizes the digital camera 100 as an AP device, and can join a network formed by the digital camera 100. A program that operates the digital camera 100 as described above is stored in the non-volatile memory 103.

While the digital camera 100 according to the present exemplary embodiment is a kind of AP, the digital camera 100 is a simplified AP that does not have a gateway function for transmitting data received from a CL device to an internet provider or the like. Therefore, even if data is received from another apparatus, which joins a network formed by the digital camera 100, the digital camera 100 cannot transfer the received data to a network, such as an internet.

The above has described the digital camera 100.

<Internal Configuration of Remote Controller 200>

Figure 2:
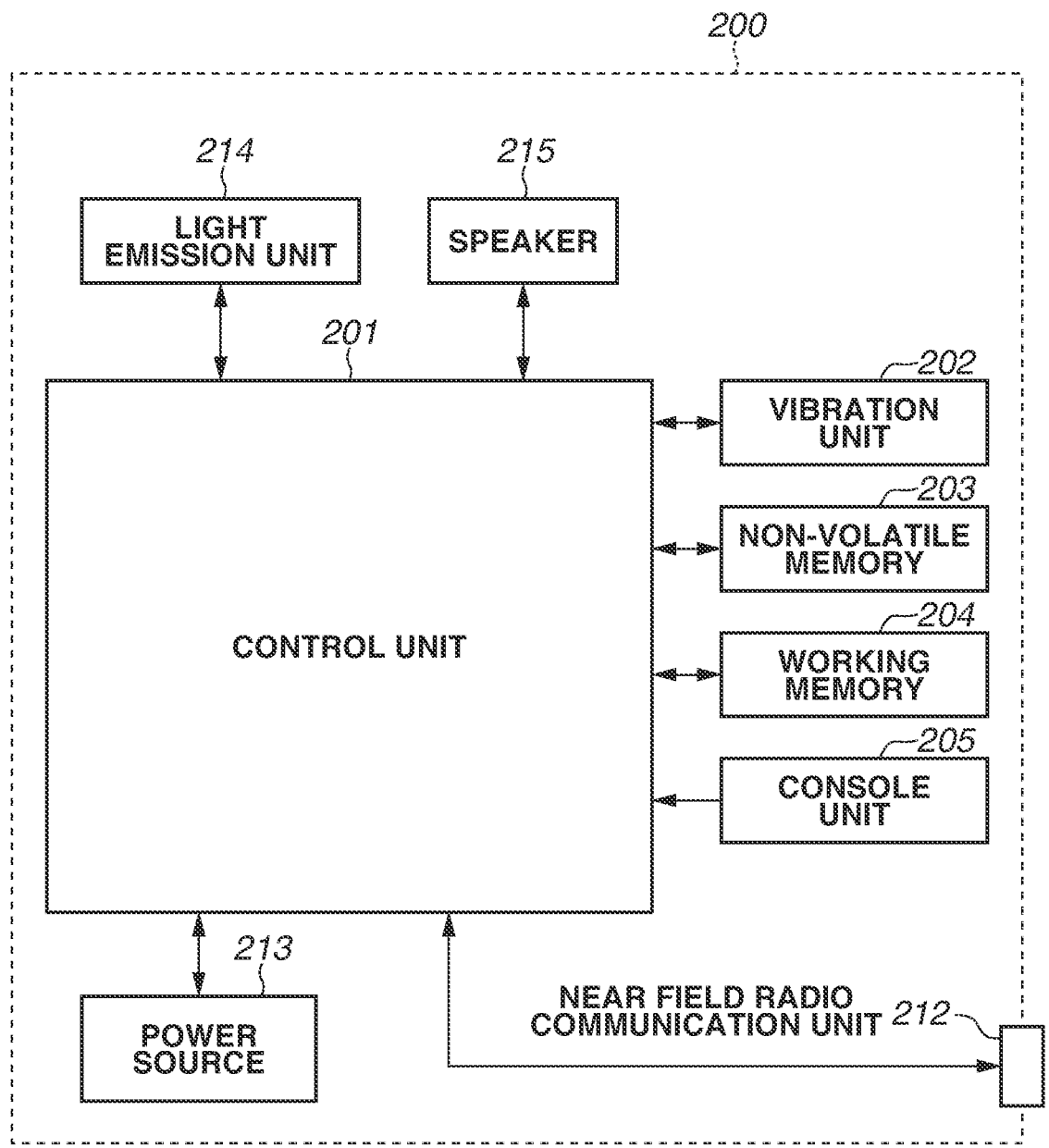
FIG. 2 is a block diagram illustrating a configuration of a mobile phone according to the first exemplary embodiment.

FIG. 2 is a block diagram illustrating a configuration example of the remote controller 200 according to the present exemplary embodiment.

A control unit 201 controls each element of the remote controller 200 in accordance with an input signal or a program described below. The control unit 201 does not necessarily control the entire remote controller 200, but plural pieces of hardware can share the process to control the entire remote controller 200.

A non-volatile memory 203 is a memory that can electrically perform deletion and recording. Basic software that is executed by the control unit 201 is recorded in the non-volatile memory 203.

A working memory 204 is used as a working area of the control unit 201.

A console unit 205 is used for accepting an instruction to the remote controller 200 from a user. The console unit 205 includes, for example, a release button for inputting an instruction for release to the digital camera 100. The console unit 205 includes an auto focus (AF) button for inputting an instruction for AF to the digital camera 100. The console unit 205 includes a zoom wide button for inputting an instruction shift zooming to a wide-angle side to the digital camera 100. The console unit 205 includes a zoom telephoto button for inputting an instruction to shift zooming to a telephoto side to the digital camera 100.

A near field radio communication unit 212 includes, for example, an antenna for wireless communication, a modulation/demodulation circuit that processes a wireless signal, and a communication controller. The near field radio communication unit 212 outputs a modulated wireless signal from the antenna, and demodulates the wireless signal received through the antenna to realize near field radio communication according to the IEEE 802.15 standard. In the present exemplary embodiment, the near field radio communication unit 112 communicates with another apparatus in accordance with the IEEE 802.15.1 standard (Bluetooth). In the present exemplary embodiment, the Bluetooth communication employs Bluetooth Low Energy version 4.0, which consumes only a low amount of power.

A power source 213 supplies electric power to the respective sections of the remote controller 200. In the present exemplary embodiment, for example, a button battery is used.

Vibration of a vibration unit 202, light emission from a light emission unit 214, and a beep from a speaker 215 are used to provide information notifying an operation performed by a user or acceptance of a command transmitted to the digital camera 100 based on the operation to the user.

The above has described the remote controller 200.

<System Configuration>

Figure 3:
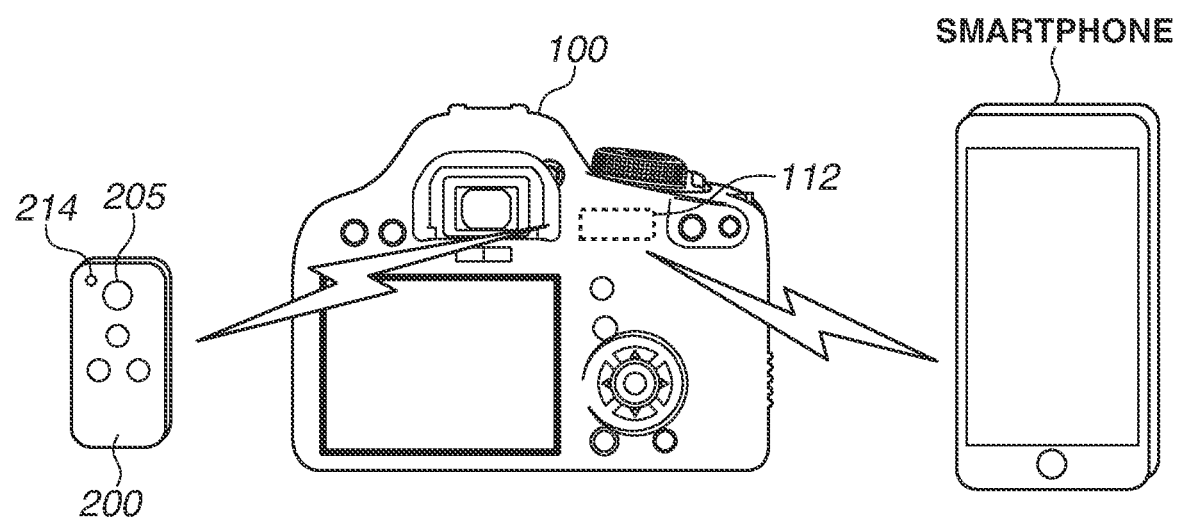
FIG. 3 is a schematic diagram illustrating a configuration of a system including the digital camera, the mobile phone, and a remote controller according to the first exemplary embodiment.

FIG. 3 is a schematic diagram of a communication system including the digital camera 100, the remote controller 200, and a smartphone according to the exemplary embodiment of the present invention.

The digital camera 100 can capture an image based on an instruction from the remote controller 200. Upon completion of the image capture, the digital camera 100 transmits information about the completion of the image capture to the remote controller 200. In response to the transmission, the remote controller 200 turns on the light emission unit 214 (for example, light-emitting diode (LED)), and notifies a user of acceptance of an image capture instruction.

The digital camera 100 can also capture an image based on an instruction from the smartphone. In this case, an application installed in the smartphone in advance is launched to set the smartphone to a remote control mode through the application, and the digital camera 100 is remotely controlled.

The wireless communication between the digital camera 100 and the remote controller 200 or the smartphone employs the Bluetooth Low Energy standard with which a transmission/reception operation can be intermittently performed consuming only low power when standing by. Particularly in a case where large-capacity data does not have to be transmitted, a standard that enables an operation, which consumes low power, is preferably used. Another application of the wireless communication of the digital camera 100 is transmission of captured image or video. In such a case where large-capacity data has to be exchanged at a high speed, the communication speed of the Bluetooth Low Energy standard is insufficient. In this case, a comparatively high-speed communication standard such as wireless LAN is used. The present exemplary embodiment provides a description based on the Bluetooth Low Energy standard, but the standard is not limited thereto. Other wireless communication standards such as Wireless Fidelity (Wi-Fi®) or Zigbee®, can be used.

The digital camera 100 can be connected to only one apparatus via the Bluetooth Low Energy at any given time. Therefore, the digital camera 100 cannot be simultaneously connected to the remote controller 200 and the smartphone. When connecting to either the remote controller or the smartphone, a user has to operate a setting menu of the digital camera 100 in advance to pair the digital camera 100 with a connection partner device. At this time, the connection partner device is identified, and information about the identification is stored. As a result, the digital camera 100 is controlled to, next time, connect only to the remote controller 200 or the smartphone that has been paired. This control prevents an erroneous operation from a third person, as well as an unintentional operation. The user performs the pairing operation on the respective devices, and sets one device to be connected. As a result, the digital camera 100 stands-by for the connection to the remote controller 200 or the smartphone, whichever is desirable for use.

In a case where the digital camera 100 is in a power-on state, which is a first operation mode, a setting time has elapsed that is set by the user without performing any operation, and the digital camera 100 shifts to an auto power-off state, which is a second operation mode. In the auto power-off mode, battery consumption is suppressed, in comparison with the power-on state, by causing the circuit inside the digital camera 100 to hibernate. Even in this mode, the digital camera 100 can be returned from the auto power-off mode to the operation mode by an operation on the partner device while maintaining standby state for a wireless signal.

The Bluetooth Low Energy standard is a standard of very low power consumption, but has to be used based on communication conditions because power saving performance required by the wireless communication differs between the power-on state and the auto power-off state. More specifically, in the power-on state, power consumption of other circuits is dominant inside the digital camera 100, and thus the wireless communication comparatively has leeway in consuming power. Therefore, in the Bluetooth Low Energy communication, when the user operates the connection partner device, the digital camera 100 quickly detects a signal by shortening communication intervals of intermittent communication. Therefore, the digital camera 100 can perform an operation based on the user operation in the connection partner device.

In the auto power-off state, battery consumption has to be as low as possible. A time during which the digital camera 100 is not used is longer than a time during which it is used. If the battery is drained in the auto power-off state, the image capture cannot be performed when the user desires to capture an image next time. Therefore, in the auto power-off state, the power consumption is reduced by lengthening an interval for intermittent communication as long as possible. Note that in this case, when the user operates the communication partner device, the digital camera 100 cannot quickly respond to the operation because of the long communication interval.

The communication based on the Bluetooth Low Energy standard includes a plurality of operation states, such as an advertising operation and a connection operation, and a pattern of an electric current to be consumed differs in the respective states. In the advertising operation, information about a connectable state is transmitted to the partner device at predetermined intervals, and the digital camera 100 does not receive a signal until the communication partner device provides a response. In one-time operation to be performed at the predetermined interval, an operation for three channels allocated to the advertising operation is performed. The communication partner device tries to receive an advertising signal at any chosen timing, and responds to the signal and transmits it if the partner device receives the signal. In such a manner, the connection is established, and thus data can be transmitted/received. The digital camera 100 outputs the advertising signal because it is on a standby side.

In the connection operation, the digital camera 100 repeats transmission/reception intermittently with the communication partner device based on a communication interval determined when the connection is established. In this operation, since the communication is performed in a communication channel determined by both the devices, one-time operation performed at the predetermined interval is carried out through one channel. Therefore, if communication intervals are the same, the standby operation consumes lower power in the connection operation in comparison with the advertising operation. Conversely, in a case where electric power that can be consumed is determined beforehand, the communication interval has to be set longer in the advertising operation than in the connection operation.

<Operation in Power-On State>

FIG. 4A illustrates a sequence for controlling the digital camera 100 using the remote controller 200 when the digital camera 100 is on. When the digital camera 100 is on, the power is dominantly consumed in elements such as an image pickup sensor, a display device, a recording device, and a microprocessor/image processing engine, other than the wireless communication apparatus. Therefore, the wireless communication apparatus accounts for a relatively low percentage of the power consumption. Therefore, the wireless communication apparatus comparatively has leeway in consuming power. In FIG. 4A, when the digital camera 100 is powered on, the wireless communication apparatus periodically transmits an advertising packet at a communication interval represented by an advertising interval 1. The advertising interval 1 is set to a sufficiently short interval, such as 30 milliseconds, compared to a human operation speed in order to quickly respond to an operation of the remote controller 200. That is to say, the setting is made placing emphasis on the response.

When the release button is operated by the remote controller 200, near field radio communication unit 212 starts performing a scanning operation for the advertising packet, and receives the advertising packet from the digital camera 100 to start the wireless communication. When the wireless communication is started, the digital camera 100 receives a signal of pressing-down of the release button from the remote controller 200, and performs an image capture operation. Since the advertising interval 1 is sufficiently short with respect to the human operation speed, a release time lag can be extremely shortened, namely, to a few dozen milliseconds to a few hundred milliseconds. That is, the user can perform a remote operation through the remote controller as if the user operates the release button of the camera body without being annoyed by a time required for the wireless communication.

<Conventional Example>

FIG. 4B illustrates a conventional example of a sequence for controlling the digital camera 100 using the remote controller 200. A difference from FIG. 4A is that a user operates the remote controller 200 when the digital camera 100 is put into the auto power-off state after a time set by the user on a menu in advance has elapsed from a moment the digital camera 100 is powered on.

The remote controller 200 is used for remotely controlling the digital camera 100. For example, in a case where a group photo is taken, the user mounts the digital camera 100 on a tripod, puts the digital camera 100 in a remote control mode, views a finder, and performs framing. Thereafter, the user moves to a position where the group waits, and carries out remote control to operate the digital camera 100. This takes a time ranging from a few dozen seconds to a maximum of a few minutes. That is, it is likely that the setting time elapses while such an operation is performed, and the digital camera 100 goes into the auto power-off state.

In a case other than a group photo where the remote controller 200 is used, the framing in the digital camera 100 is performed to compose a picture and the remote operation is performed away from the digital camera 100. Therefore, the operation in such a circumstance takes a certain time, and thus the digital camera 100 can enter the auto power-off state.

In FIG. 4B, like in FIG. 4A, when the camera is powered on, the wireless communication apparatus periodically transmits an advertising packet at a communication interval represented by an advertising interval 1 (for example, an interval of 30 milliseconds). The digital camera 100 in the power-on state shifts to the auto power-off state when the setting time set in advance by the user on the menu elapses. Since an operation time in this state is comparatively long, the power consumption is required to be as low as possible. Therefore, the wireless communication apparatus is set such that average power consumption becomes low by lengthening the advertising interval. In the Bluetooth Low Energy standard, the power consumption between communication and communication is sufficiently lower than the power consumption required by one-time communication. Therefore, the longer the interval between communication and communication, the lower the average power consumption.

In FIG. 4B, the interval in this case is represented by an advertising interval 3, and is set to a long interval of, for example, approximately one second. The interval of one second can be deemed comparatively long with respect to the human operation speed.

If the release button of the remote controller 200 is operated in this state, the microprocessor/wireless communication IC (226) of the remote controller 200 starts the scanning operation for an advertising packet, similar to the case of FIG. 4A. Differently from the case of FIG. 4A, since the advertising packet is transmitted only once per second, the advertising packet cannot necessarily and immediately be received when the scanning operation is performed. More specifically, the advertising packet can be immediately received depending on timing at which the release button is pressed, namely, on scanning start timing, but can be received only when scanning has been performed for one second in the longest case. Under a bad radio wave condition, if the reception of the advertising packet is missed once, the apparatus has to wait an additional second for the next reception. After the advertising packet is received in such a manner, the wireless communication starts. When the wireless communication is started, the digital camera 100 in the auto power-off state first returns to the power-on state. The return takes a few dozen milliseconds to a few hundred milliseconds. After the return, the digital camera 100 receives information about pressing of the release button from the remote controller 200, and performs the image capture operation. A release time lag in this case is a few dozen milliseconds to a few seconds, namely, the release time lag is rather long, so that the user is forced to wait for a little while after the operation. Therefore, it is difficult for the user to operate the remote controller 200 as though the user operates the release button of the camera body.

<Operation of Digital Camera According to the Present Exemplary Embodiment>

In FIG. 5A, similar to FIGS. 4A and 4B, in a case where the digital camera 100 is powered on, the wireless communication apparatus periodically transmits an advertising packet at the communication interval (for example, the interval of 30 milliseconds) represented by the advertising interval 1. The camera in the power-on state shifts to the auto power-off state when the setting time set in advance by the user on the menu has elapsed. In this state, the power consumption is required to be as low as possible. In FIG. 5A, the communication interval is represented by an advertising interval 2. The advertising interval 2 is set to a value of, for example, about 100 milliseconds. This interval is an intermediate interval between the advertising interval 1 and the advertising interval 3, and the setting places emphasis not on the power consumption but on the response, though not so much emphasis as the advertising interval 1.

In this state, when the release button of the remote controller is operated, like in the case of FIG. 4A, the microprocessor/wireless communication IC (226) of the remote controller 200 starts performing a scanning operation on the advertising packet. Differently from the case of FIG. 4B, the advertising packet is transmitted once per 100 milliseconds and the advertising packet can be received comparatively quickly after performing the scanning operation. After receipt of the advertising packet, the wireless communication starts between the digital camera 100 and the remote controller 200. When the wireless communication is started, first, the digital camera 100 in the auto power-off state returns to the power-on state. After the return, the digital camera 100 receives information about pressing of the release button from the remote controller 200, and performs the image capture operation. A release time lag in this case is shorter than in FIG. 4B, and is about a few hundred milliseconds.

FIG. 5B illustrates an example of a sequence of the operation of the digital camera 100 when a predetermined time has passed in the auto power-off state with no operation performed in the present exemplary embodiment.

Similar to FIGS. 4A and 4B and FIG. 5A, when the digital camera 100 is powered on, the wireless communication apparatus periodically transmits an advertising packet at the communication interval (for example, the interval of 30 milliseconds) represented by the advertising interval 1. In this state, the digital camera 100 in the power-on state shifts to the auto power-off state after the setting time during which the user performs no operation has elapsed.

In this state, the power consumption is required to be as low as possible. Similar to FIG. 5A, the communication interval is set to an interval represented by the advertising interval 2, namely, to about 100 milliseconds. This interval places emphasis more on the power consumption than on the response.

In a case where the user still performs no operation, an advertising transmission interval becomes the advertising interval 3 that is longer than the advertising interval 2 after the predetermined time has elapsed. This interval is set to be a long interval of, for example, one second similar to FIG. 4B, and thus, the average power consumption can be additionally reduced.

The predetermined time is, for example, about 2 minutes to 5 minutes. The predetermined time is sufficient for the user to operate the digital camera 100, decide framing, and actually operate the remote controller 200. The operation of the remote controller 200 during the predetermined time can provide smooth operability to the user without the user becoming too annoyed by the reaction time, unlike the case of FIG. 5A. Since the state of the low power consumption can be maintained similar to FIG. 4B after the predetermined time has elapsed, a remaining battery level does not drop immediately even if the digital camera 100 is left without changing the setting after it has been used. Accordingly, a possibility that the battery is drained and thus image capture cannot be performed can be reduced as low as possible at the time of next image capture.

<Remote Control from Smartphone>

FIG. 6 illustrates an example of a sequence for controlling the digital camera 100 using the smartphone.

In a case where the digital camera 100 is controlled by the smartphone, a mode in which the digital camera 100 is connected to the remote controller 200 has to be changed into a mode of connecting to the smartphone. When the mode for the camera is set to the connection mode to the smartphone, the camera, at that time, establishes the connection to the smartphone previously paired. This is because the smartphone is always waiting for the Bluetooth Low Energy communication during a normal operation due to a high-capacity battery of the smartphone, unlike the remote controller 200. When the connection is established between the digital camera 100 and the smartphone, differently from a case of the remote controller 200, the camera does not one-sidedly transmit an advertising packet, but the digital camera 100 and the smartphone transmit/receive an advertising packet to/from each other at a certain interval.

The connection is also maintained in the auto power-off state of the digital camera 100, and a communication interval is represented by a connection interval 2. This interval is an interval of, for example, about 500 milliseconds.

A difference between the advertising and the connection is that the advertising requires communication in three channels in one-time communication performed intermittently while the connection requires communication in one channel and thus, electric power necessary for one-time communication is low. Therefore, in a case where the average power consumption of the advertising is approximately equal to that of the advertising, the communication interval can be shorter in the connection than in the advertising. Therefore, while in the auto power-off state, the advertising interval 3 is about 1 second, the connection interval 2 is 500 milliseconds.

In this state, when the smartphone is operated to start a connection application for the digital camera 100, the digital camera 100 detects its signal and returns from the auto power-off state to the power-on state. Upon the return, the connection interval is changed into an interval represented by a connection interval 1 in FIG. 6. This interval is set to, for example, 30 milliseconds, which is approximately equal to the advertising interval 1 in FIGS. 4A and 4B and FIGS. 5A and 5B.

The reason for this is similar to the description with reference to FIG. 4A. More specifically, when the digital camera 100 is in the power-on state, the power is dominantly consumed in portions such as an image capturing sensor, a display device, a recording device, and a microprocessor/image processing engine, other than the wireless communication apparatus. Therefore, the power consumption in the wireless communication apparatus is comparatively low. Accordingly, the wireless communication apparatus comparatively has leeway in consuming power. Consequently, the digital camera 100 quickly responds to the operation of the smartphone, and thus the interval is set to 30 milliseconds that is sufficiently short compared to a human operation speed.

Figure 7:
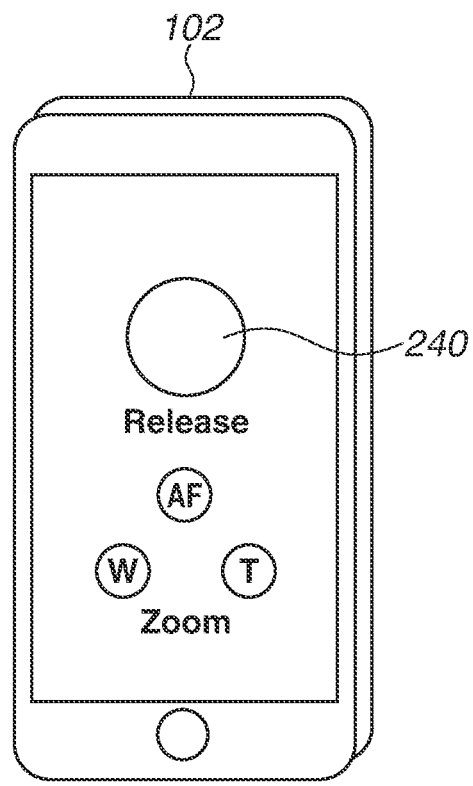
FIG. 7 illustrates one example of a screen in a case where the digital camera is controlled by using the smartphone according to the first exemplary embodiment.

FIG. 7 illustrates one example of a camera operation screen of the smartphone according to the present exemplary embodiment. When an application of the smartphone is set to a remote control mode, this screen appears. A release button, an AF button, zoom (wide and telephoto) buttons are disposed on the screen, and when these buttons are touched, a function equivalent to the function of the remote controller 200 can be performed.

When the release button in FIG. 7 is operated, this operation is transmitted to the digital camera 100 at the earliest communication timing at the connection interval 1 in FIG. 6. Upon receipt, the digital camera 100 performs an image capture operation. Like FIG. 4A, since the connection interval 1 is sufficiently short compared to the human operation speed, a release time lag can be extremely shortened, namely, to a few dozen milliseconds to a few hundred milliseconds. That is, the user can perform a remote operation through the smartphone as if the user operates the release button of the camera body without being annoyed by a time required for the wireless communication.

With reference to FIG. 6, when the application of the smartphone is finished, a signal is transmitted to the digital camera 100 to that effect. When the auto power-off time set by the user has elapsed from this moment, the digital camera 100 shifts to the auto power-off state. After the camera shifts to the auto power-off state, the connection interval is set to about 500 milliseconds of the connection interval 2, and thus the low power consumption state, can be maintained. Therefore, even in a case where the camera is left as it is without changing the setting after the digital camera 100 has been used, the remaining battery power is not immediately drained. Therefore, a possibility that the battery power is drained and thus image capture cannot be performed at a time of next image capture can be reduced as low as possible.

<Operation of Digital Camera>

Figure 8:
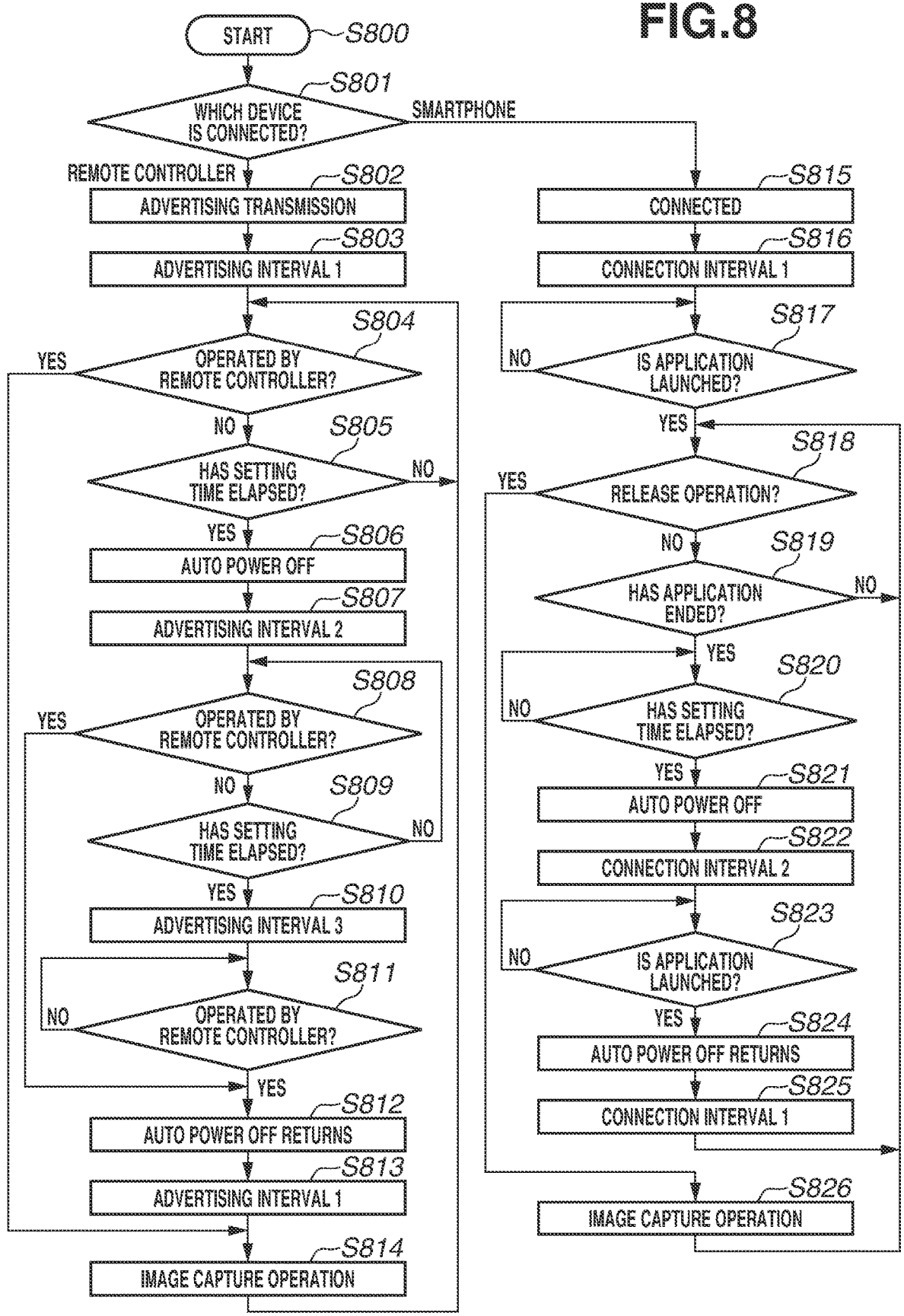
FIG. 8 is a flowchart of the digital camera according to the first exemplary embodiment.

FIG. 8 is a flowchart illustrating the sequences described above. The flowchart depicts an operation for remotely controlling the digital camera 100 through the remote controller 200 and the smartphone.

When a battery is inserted into the digital camera 100 and the camera system is powered on to start an operation, in step S801, the control unit 101 determines whether a device type to be connected is the remote controller 200 or the smartphone.

A case where the remote controller 200 is set as the device to be connected in step S801 will be described first.

In this case, the processing proceeds to step S802, and the near field radio communication unit 112 starts transmission of an advertising packet. Since the digital camera 100 has been powered on, in step S803, the near field radio communication unit 112 sets the transmission interval to the advertising interval 1 (30 milliseconds).

In this state, if the control unit 101 detects a release operation in the remote controller 200 in step S804, in step S814 the control unit 101 performs an image capture operation. Herein, the release operation is detected in a following procedure. When the release button is pressed down on the remote controller 200, the remote controller 200 performs a scanning operation and receives an advertising signal of the digital camera 100. The remote controller 200, which has received the advertising signal, transmits a connection request to the digital camera 100, and the digital camera 100, which has received the request, accepts the connection request. Thus, a Bluetooth Low Energy connection is established between the digital camera 100 and the remote controller 200. When the Bluetooth Low Energy connection has been established, a command indicating that the release button has been pressed down is transmitted from the remote controller 200 to the digital camera 100. Upon receipt of the command, the digital camera 100 detects that the remote controller 200 has performed the release operation. In the present exemplary embodiment, when the image capture operation is performed based on an instruction from the remote controller 200, the connection to the remote controller 200 is released, and the digital camera 100 is brought into a state of sending the advertising again.

Next, if the setting time has elapsed without any operation, in step S806, the control unit 101 shifts to the auto power-off state. In the auto power-off state, electric power is not supplied to the control unit 101.

In the auto power-off state, in step S807, the near field radio communication unit 112 sets the transmission interval to the advertising interval 2 (100 milliseconds).

In step S809, the near field radio communication unit 112 determines whether the predetermined time has elapsed. In step S810, the near field radio communication unit 112 sets the transmission interval to the advertising interval 3 (1 second) when the predetermined time has elapsed.

Whether in the state of the advertising interval 2 (100 milliseconds) or the advertising interval 3 (1 second), if the remote controller 200 is operated, in step S812, the control unit 101 returns from the auto power-off state to the power-on state. Herein, when the near field radio communication unit 112 issues an event upon receipt of a command transmitted from the remote controller 200 or the smartphone, supply of electric power from the power source to the control unit 101 is started. As a result, the control unit 101 returns from the auto power-off state to the power-on state.

Thereafter, in step S813, the near field radio communication unit 112 sets the transmission interval to the advertising interval 1 (30 milliseconds).

In step S814, the control unit 101 performs the image capture operation.

A case where the smartphone is set as the device to be connected in step S801 will be described below.

In this state, in step S815, the near field radio communication unit 112 establishes a wireless connection with the smartphone paired in advance and enters a connected state. To enter this connected state, a following procedure is executed. The near field radio communication unit 112 transmits an advertising packet at the advertising interval 1 (30 milliseconds). The smartphone, which has received the packet, sends back a connection request as a response to trigger a connecting process. Thereafter, the digital camera 100 enters the connection state through a procedure according to the standard. When the digital camera 100 shifts to the connection state, the near field radio communication unit 112 stops sending of the advertising.

In step S816, the near field radio communication unit 112 sets the transmission interval to the connection interval 1 (30 milliseconds).

In step S817, the control unit 101 determines whether an application of the smartphone has been launched. If the application has been launched, the processing proceeds to step S818. The determination whether the application is launched can be made based on status information or the like acquired through the near field radio communication unit 112.

In step S818, the control unit 101 determines whether a release operation is performed in the smartphone. If the release operation is performed, in step S826, the control unit 101 performs an image capture operation.

In step S819, the control unit 101 determines whether the application has finished. If the application has finished, the processing proceeds to step S820.

In step S820, the control unit 101 determines whether the setting time has elapsed. If the setting time has elapsed, the control unit 101 shifts to the auto power-off state in step S821.

In step S822, the near field radio communication unit 112 sets the connection interval 2 (500 milliseconds).

In this state, in step S823, the near field radio communication unit 112 determines again whether the application of the smartphone has launched. If the application has launched, in step S824, the control unit 101 returns from the auto power-off state to the power-on state, and in step S825, the near field radio communication unit 112 sets the connection interval 1 (30 milliseconds).

As described above, according to the present exemplary embodiment, the communication method or the communication interval is changed in an appropriate circumstance and at appropriate timing between the digital camera 100 and the partner device that wirelessly communicates with the digital camera 100. For this reason, the digital camera 100 having good usability can be provided, in which battery drain is suppressed and a user does not perform particular operation/setting.

According to the present exemplary embodiment, a communication device can be provided in which both of quick responsiveness to a user operation and low power consumption are realized.

Other Exemplary Embodiments

The above exemplary embodiment has mainly described the state where the smartphone and the digital camera 100 are connected with each other in the case where a setting is made to connect to the smartphone. In another exemplary embodiment a digital camera comes into the auto power-off state while a smartphone and the digital camera are not connected with each other. In this case, when a setting is made to connect to the smartphone, a transmission interval of an advertising packet can be set to the advertising interval 1 (30 milliseconds) in the power-on state. When the camera comes into the auto power-off state, a transmission interval of the advertising packet is maintained in the advertising interval 1 (30 milliseconds) during the predetermined time. This is based on a period during which a connection can be more quickly established is set long as much as possible. If the predetermined time elapses, the transmission interval of the advertising packet is set to the advertising interval 3 (1 second). This processing improves power saving.

Alternatively, the processing can be executed in the following manner. In a case where a setting is made to connect to a smartphone, in the power-on state, the transmission interval of the advertising packet is set to the advertising interval 2 (100 milliseconds). This setting improves power saving. The transmission interval is not set to the advertising interval 1 (30 milliseconds) for the following reason. In the case of the smartphone, a trigger for the connection is not a user operation, unlike a remote controller. In the case of the remote controller, since a connection is established by performing a scanning operation through a user operation as a trigger, the transmission interval has to be set to the advertising interval 1 (30 milliseconds) in order to provide a sufficient response. In the case of the smartphone, since the user performs an operation while viewing a screen that changes after the connection, necessity to increase responsiveness to the user operation for making a connection is lower than in the case of the remote controller. Therefore, the transmission interval is set to the advertising interval 2 (100 milliseconds). When the predetermined time during which no connection is established has elapsed, like the case of the remote controller, the transmission interval is set to the advertising interval 3 (1 second), and this setting additionally improves power saving.

One or more functions according to the above exemplary embodiment can be achieved by supplying a program to a system or an apparatus via of a storage medium, and loading and executing the program by one or more processors in a computer of the system or the apparatus. The one or more functions can also be achieved by a circuit (for example, an application specific integrated circuit (ASIC)).

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-012535, filed Jan. 26, 2017, which is hereby incorporated by reference herein in its entirety.

What is claimed is:

1. A communication apparatus comprising:
a communication interface; and
one or more processors,
wherein the one or more processors transmit a broadcast signal at a predetermined interval via the communication interface,
wherein the one or more processors control a state of the communication apparatus, the state including a first state and a second state in which power consumption is lower than in the first state,
wherein in a case where the one or more processors shift the state of the communication apparatus from the first state to the second state, the one or more processors changes a transmission interval of the broadcast signal from a first interval to a second interval, which is longer than the first interval, and in a case where a predetermined time has elapsed after the one or more processors shift the state of the communication apparatus from the first state to the second state, the one or more processors change the transmission interval of the broadcast signal to a third interval, which is longer than the second interval,
wherein the broadcast signal is broadcast to a plurality of channels, and
wherein when a connection is maintained to a communication partner device, the one or more processors transmit a communication signal to a channel determined together with the communication partner device.

2. The communication apparatus according to claim 1, wherein when a connection to a communication partner device is maintained, the one or more processors do not transmit the broadcast signal.

3. The communication apparatus according to claim 1, wherein the one or more processors transmit/receive a signal to/from a communication partner device in accordance with Bluetooth® Low Energy.

4. The communication apparatus according to claim 1, further comprising an interface configured to accept an operation for making a setting whether to cause the communication apparatus to communicate with a mobile phone or a remote controller,
wherein in a case where a connection to the remote controller is established in a state where the communication with the remote controller is set, the one or more processors transmits a signal at a fourth interval, which is shorter than the third interval.

5. The communication apparatus according to claim 4, further comprising an image capturing unit configured to capture an image of a subject,
wherein when communicating with either the mobile phone or the remote controller, the one or more processors receives a command to control the image capturing unit.

6. The communication apparatus according to claim 1, wherein the second interval is longer than the first interval.

7. A control method for a communication apparatus including a communication unit and a control unit including a first state and a second state in which power consumption is lower than in the first state, the control method comprising:
changing a transmission interval of a broadcast signal from a first interval to a second interval, which is longer than the first interval, in a case where the control unit shifts from the first state to the second state; and
changing the transmission interval of the signal to a third interval, which is longer than the second interval, in a case where a predetermined time has elapsed after the control unit shifts from the first state to the second state;
wherein the broadcast signal is broadcast to a plurality of channels, and
wherein when a connection to a communication partner device is maintained, a communication signal is transmitted to a channel, which is determined together with the communication partner device.

8. The control method according to claim 7, wherein when the connection to the communication partner device is maintained, an advertising signal is not transmitted.

9. The control method according to claim 7, further comprising:
accepting an operation for setting communication with a mobile phone or communication with a remote controller; and
transmitting a signal at a fourth interval, which is shorter than the third interval, when a connection with the remote controller is established in a state where the communication with the remote controller is set.

10. A non-transitory computer-readable storage medium storing a program for causing a communication apparatus to execute a control method, the communication apparatus including a communication unit and a control unit having a first state and a second state in which power consumption is lower than in the first state, the control method comprising:
changing a transmission interval of a broadcast signal from a first interval to a second interval, which is longer than the first interval, in a case where the control unit shifts from the first state to the second state; and
changing the transmission interval of the signal to a third interval, which is longer than the second interval, in a case where a predetermined time has elapsed after the control unit shifts from the first state to the second state,
wherein the broadcast signal is broadcast to a plurality of channels, and wherein when a connection to a communication partner device is maintained, a communication signal is transmitted to a channel, which is determined together with the communication partner device.

* * * * *